US010139070B2

(12) United States Patent
Reitegger et al.

(10) Patent No.: US 10,139,070 B2
(45) Date of Patent: Nov. 27, 2018

(54) LIGHT MODULE FOR A VEHICLE HEADLAMP

(71) Applicant: ZIZALA LICHTSYSTEME GMBH, Wieselburg (AT)

(72) Inventors: Oliver Reitegger, Groebming (AT); Udo Maier, Herzogenburg (AT)

(73) Assignee: ZKW GROUP GMBH, Wieselburg (AT)

( * ) Notice: Subject to any disclaimer, the term of this patent is extended or adjusted under 35 U.S.C. 154(b) by 540 days.

(21) Appl. No.: 14/767,766

(22) PCT Filed: Feb. 13, 2014

(86) PCT No.: PCT/AT2014/050040
§ 371 (c)(1),
(2) Date: Aug. 13, 2015

(87) PCT Pub. No.: WO2014/124477
PCT Pub. Date: Aug. 21, 2014

(65) Prior Publication Data
US 2015/0377440 A1   Dec. 31, 2015

(30) Foreign Application Priority Data

Feb. 14, 2013   (AT) .............................. A 50108/2013
Feb. 10, 2014   (AT) .............................. A 50097/2014

(51) Int. Cl.
*F21S 41/29*   (2018.01)
*B60Q 1/068*   (2006.01)
(Continued)

(52) U.S. Cl.
CPC ............ *F21S 41/29* (2018.01); *B60Q 1/0683* (2013.01); *F21S 41/141* (2018.01); *F21S 41/143* (2018.01);
(Continued)

(58) Field of Classification Search
CPC ...... B60Q 1/0683; B60Q 1/2611; B60Q 1/32; F21S 48/1208; F21S 48/1104;
(Continued)

(56) References Cited

U.S. PATENT DOCUMENTS 5,264,993 A * 11/1993 Neumann ............. F21S 41/323
362/510
5,577,836 A * 11/1996 Vent ..................... B60Q 1/0683
362/421
(Continued)

FOREIGN PATENT DOCUMENTS

AT            506090 A4     6/2009
DE      102006020961 A1    5/2006
(Continued)

OTHER PUBLICATIONS

First Office Action of Austrian Patent Application No. 50108/2012 dated Dec. 13, 2013.
(Continued)

*Primary Examiner* — Anh Mai
*Assistant Examiner* — Fatima Farokhrooz
(74) *Attorney, Agent, or Firm* — Eversheds Sutherland (US) LLP

(57) ABSTRACT

The invention relates to a light module (2) for a headlight, in particular a motor vehicle headlight, wherein the light module (2) comprises:
one or more light sources (4), which is/are arranged on a light source carrier (5),
at least one auxiliary optical unit (6), wherein said at least one auxiliary optical unit (6) can be fastened on the light source carrier (5) by means of an auxiliary optical unit carrier (7) such that the light sources (4), the light source carrier (5), the at least one auxiliary optical unit (6), and the auxiliary optical unit carrier (7) form a light source assembly (8), (Continued)

Figure 1:
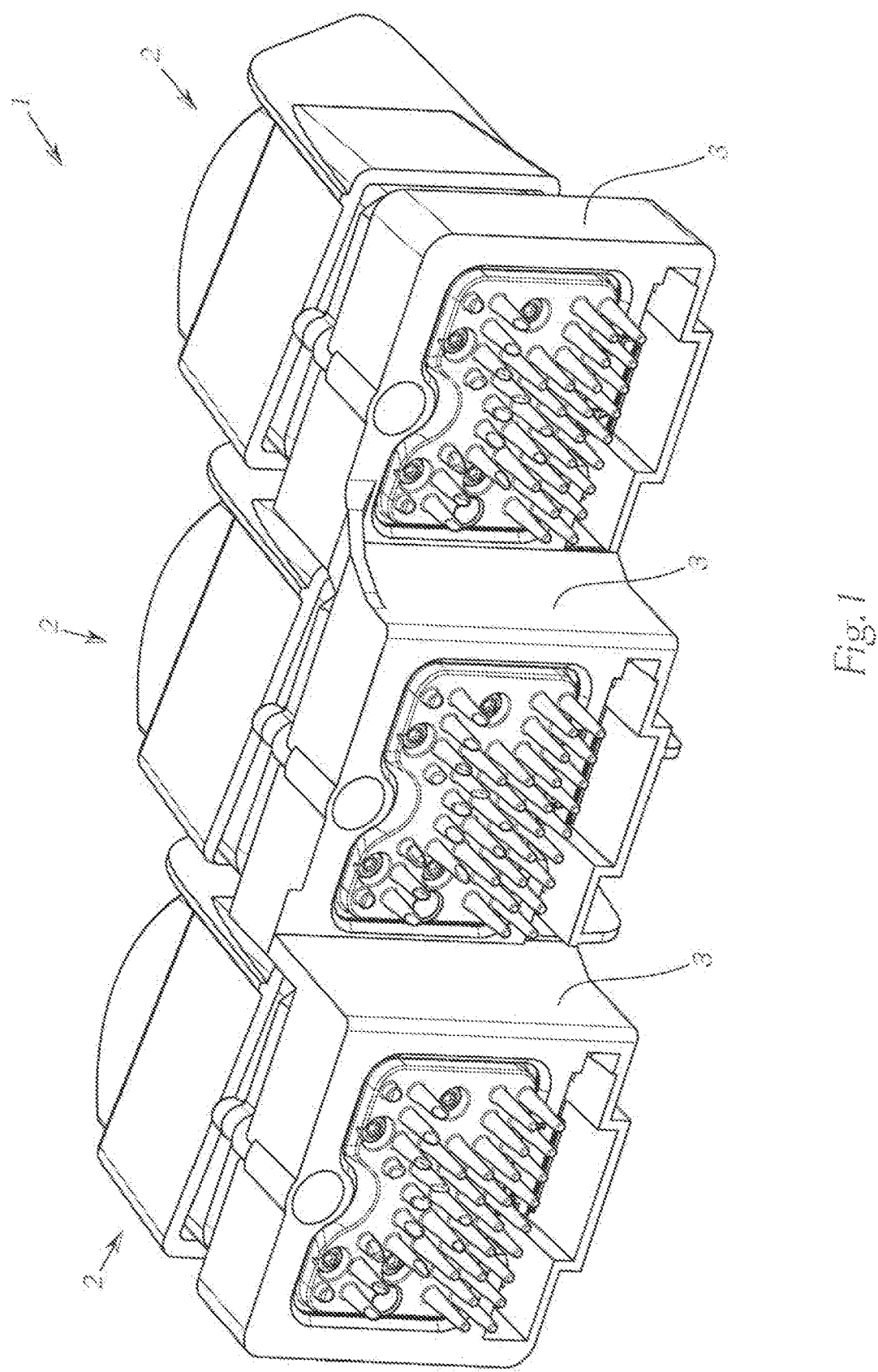

a secondary optical unit (9), which is arranged behind the at least one auxiliary optical unit (6), in the light exit direction, and is held by a secondary optical unit carrier (10), and wherein, in addition, an assembly carrier (11) is provided, relative to which the light source assembly (8) can be fastened, and wherein clamping means are provided, by means of which the light source assembly (8) can be detachably clamped between the secondary optical unit carrier (10) and the assembly carrier (11), and wherein, in the detached state of the clamping means, the light source assembly (8) is displaceable substantially parallel to the assembly carrier (11).

26 Claims, 7 Drawing Sheets

(51) Int. Cl.
| | | |
|---|---|---|
| F21S 41/19 | (2018.01) | |
| F21S 41/141 | (2018.01) | |
| F21S 41/143 | (2018.01) | |
| F21S 41/24 | (2018.01) | |
| F21S 41/25 | (2018.01) | |
| F21S 41/255 | (2018.01) | |
| F21S 41/657 | (2018.01) | |
| F21S 41/663 | (2018.01) | |
| F21S 45/49 | (2018.01) | |
| F21S 45/47 | (2018.01) | |

(52) U.S. Cl.
CPC ............ *F21S 41/19* (2018.01); *F21S 41/192* (2018.01); *F21S 41/24* (2018.01); *F21S 41/25* (2018.01); *F21S 41/255* (2018.01); *F21S 41/295* (2018.01); *F21S 41/657* (2018.01); *F21S 41/663* (2018.01); *F21S 45/47* (2018.01); *F21S 45/49* (2018.01)

(58) Field of Classification Search
CPC .. F21S 48/1109; F21S 48/115; F21S 48/1154; F21S 48/1216; F21S 48/1241; F21S 48/125; F21S 48/1258; F21S 48/1742; F21S 48/1747; F21S 48/328; F21S 43/40; F21S 43/14; F21S 43/30; F21S 41/337; F21V 5/008; F21V 13/04; F21V 13/12; F21V 29/74; F21V 29/85; F21V 29/763; F21V 7/005; F21V 7/06; G02B 19/0066; G02B 19/0028; G02B 5/1876; F21Y 2103/10; F21Y 2115/10; F21K 9/00

See application file for complete search history.

(56) References Cited

U.S. PATENT DOCUMENTS

| | | | |
|---|---|---|---|
| 6,039,466 A * | 3/2000 | Duchenne | B60Q 1/068 362/515 |
| 2002/0075693 A1* | 6/2002 | Rosenhahn | B60Q 1/1415 362/513 |
| 2003/0156410 A1* | 8/2003 | Ter-Hovhannisian | B60Q 1/32 362/241 |
| 2007/0171662 A1 | 7/2007 | Tokida | |
| 2008/0151547 A1* | 6/2008 | Grotsch | F21K 9/00 362/257 |
| 2008/0180972 A1 | 7/2008 | Sakamoto et al. | |
| 2009/0303726 A1 | 12/2009 | Borgschulte et al. | |
| 2010/0008095 A1 | 1/2010 | Tsukamoto | |
| 2010/0110660 A1* | 5/2010 | Brukilacchio | B60Q 1/2611 362/84 |
| 2010/0165653 A1* | 7/2010 | Ookubo | F21V 13/02 362/539 |
| 2010/0246201 A1* | 9/2010 | Brendle | F21S 41/19 362/519 |
| 2010/0284197 A1* | 11/2010 | Kiesel | F21V 5/002 362/507 |
| 2012/0092884 A1 | 4/2012 | Dikau et al. | |
| 2013/0088883 A1* | 4/2013 | Stiller | B60Q 1/2607 362/485 |
| 2013/0100685 A1* | 4/2013 | Weekamp | F21V 17/005 362/382 |

FOREIGN PATENT DOCUMENTS

| | | |
|---|---|---|
| DE | 102006020961 A2 | 11/2007 |
| DE | 102011051050 A1 | 12/2012 |
| EP | 1213178 A2 | 6/2002 |
| EP | 2402650 A1 | 1/2012 |
| EP | 2402650 A1 | 4/2012 |
| GB | 202779 A | 8/1923 |
| GB | 202779 A4 | 8/1923 |
| WO | 02/093228 A2 | 11/2002 |
| WO | 02093228 A2 | 11/2002 |
| WO | 2007/128762 A1 | 11/2007 |

OTHER PUBLICATIONS

First Office Action for Austrian Patent Application No. 50097/2014 dated Dec. 3, 2014.
IRPP of PCT/AT2014/050040 dated May 6, 2015.

* cited by examiner

LIGHT MODULE FOR A VEHICLE HEADLAMP

The invention relates to a light module for a headlight, in particular for a motor vehicle headlight.

The invention furthermore relates to a lighting device comprising one, preferably several, such light modules.

The invention also relates to a vehicle headlight, in particular a motor vehicle headlight, comprising at least one such lighting device.

The aforementioned lighting device comprises, e.g., two or preferably more light modules, wherein all light modules in combination form a light distribution. For example, each light module generates one or more vertical, i.e., substantially upright light segments, and the overlap of all light segments of the light modules forms a certain light distribution. By means of the targeted deactivation and/or activation of one or more light segments, it is possible to produce different light distributions, such as anti-dazzle high-beam lighting, cornering lighting, adverse-weather lighting, highway lighting, daytime-driving lighting, etc.

In order to be capable of generating optimal and, in particular, legal light distributions, it is necessary for the individual light modules to be adjusted relative to one another. Said individual light modules are usually pivotable about horizontal and vertical axes for this purpose.

Specifically, it is usually provided that the light sources of a light module—wherein said light sources are typically LED light sources—are fixedly disposed on a carrier, usually in the form of a heat sink. The entire light module, which typically also comprises a primary optical unit (auxiliary optical unit for the light sources) and a secondary optical unit (lens), is then adjusted and fixed in position, as described above, by means of complex adjusting systems, adjustment screws, etc. This procedure is mechanically complex and expensive.

A problem addressed by the invention is that of permitting a simplified adjustment of the light distribution of a light module, in particular of the light distributions of two or more light modules relative to one another.

This problem is solved by an initially mentioned light module, which comprises, according to the invention:
  one or more light sources, which is/are arranged on a light source carrier,
  at least one auxiliary optical unit, wherein said at least one auxiliary optical unit can be fastened on the light source carrier by means of an auxiliary optical unit carrier such that the light sources, the light source carrier, the at least one auxiliary optical unit, and the auxiliary optical unit carrier form a light source assembly,
  a secondary optical unit, which is arranged behind the at least one auxiliary optical unit, in the light exit direction, and is held by a secondary optical unit carrier,
  and wherein, in addition, an assembly carrier is provided, relative to which the light source assembly can be fastened,
  and wherein clamping means are provided, by means of which the light source assembly can be detachably clamped between the secondary optical unit carrier and the assembly carrier, and wherein, in the detached state of the clamping means, the light source assembly is displaceable substantially parallel to the assembly carrier.

In the present invention, the light sources of a light module are no longer fixedly mounted on the heat sink "from the start". Instead, the light source assembly generating the light distribution of the light module is initially still mounted so as to be displaceable relative to the assembly carrier thereof, wherein said assembly carrier is preferably a heat sink. By displacing the assembly, the light distribution can be oriented in a corresponding manner and, finally, in the correct, desired position, the light source assembly can be fixed relative to the assembly carrier.

The embodiment according to the invention makes it possible to omit a complicated adjusting system, because all that is necessary is to loosen the clamping—by means of which the light source assemblies are held in a clamped manner by the secondary optical unit carrier and the assembly carrier—to such an extent that the light source assembly can be easily displaced, preferably by means of a suitable tool.

According to a specific embodiment of the invention, the clamping means comprise at least one clamping screw, by means of which the assembly carrier and the secondary optical unit carrier can be directly connected to one another.

In this context, the term "directly" means that the at least one clamping screw does not extend through the light source assembly.

Particularly preferably, the clamping means comprise exactly two clamping screws.

By means of two clamping screws, which are positioned with suitable spacing from one another, the light source assembly can be clamped as uniformly and reliably as possible.

The use of clamping screws as clamping means has the advantage that, on the one hand, said clamping screws are low-cost and are easy to handle in the application and, on the other hand, the two carriers can be ultimately reliably fastened to one another in a stable manner by means of these clamping screws.

According to a specific embodiment of the invention, the secondary optical unit carrier forms a guide for the light source assembly, in which this light source assembly is mounted so as to be displaceable, in particular laterally, i.e., horizontally relative to the installation position of the light module.

In order to displace the light source assembly, the clamping means are detached, although only so far that the two carriers are still connected to one another, but the light source assembly can be displaced therebetween.

By means of the configuration of a guide, which can also be provided, in principle, on the assembly carrier or which is formed by the assembly carrier and the secondary optical unit carrier in combination, but which is preferably formed by the secondary optical unit carrier, a guided and/or limited movement of the light source assembly is made possible such that the adjustment can be carried out in a substantially more controlled manner.

In addition, locking means are provided, by means of which the light source assembly can be fixed relative to the assembly carrier.

After setting the correct position, it is therefore also possible, in addition to the clamping, to fix the light source assembly via the locking means relative to the assembly carrier such that the light source assembly is reliably positioned also during operation of the vehicle.

Specifically, it is provided that the locking means fasten the light source assembly on the assembly carrier and/or the secondary optical unit carrier, preferably on both carriers.

According to an advantageous embodiment, the locking means comprise at least one locking screw, wherein said locking screw extends through a back side of the assembly carrier, through an assigned locking-screw opening in the assembly carrier, and through an assembly opening, and can be screwed into a corresponding locking-screw thread in the secondary optical unit carrier.

In addition, it is advantageously provided that the at least one assembly opening is designed as a slot, wherein, in the installation position, the slot preferably extends in the horizontal direction, substantially normally relative to the light exit direction.

Specifically, the locking means comprise exactly two locking screws having assigned openings or threads.

In addition, it is advantageously provided that the at least one assembly opening is formed on the auxiliary optical unit carrier, wherein said auxiliary optical unit carrier is usually substantially more stable than the light source carrier.

It is usually provided that the auxiliary optical unit carrier can be detachably fastened, e.g., snapped in or clipped on, to the light source carrier.

The light source carrier and the auxiliary optical unit carrier are centered relative to one another and are snapped in advance to form the light source assembly.

In order to ensure that the light source assembly can be easily adjusted, it is advantageously provided that the assembly carrier has a tool opening for the insertion of a displacement tool, by means of which the light source assembly can be displaced.

It is also provided that the light source assembly has an adjustment opening, which is disposed opposite the tool opening, wherein the adjustment opening is preferably disposed on the auxiliary optical unit carrier, and into which adjustment opening the displacement tool engages via a tool section.

When the tool is moved in the tool opening, the tool having the tool section—which engages into the adjustment opening on the light source assembly—displaces the light source assembly in a corresponding manner.

According to a specific embodiment, the displacement tool having a tool mounting section, which has a circular cross section, is rotatably mounted in the tool opening, which also has a circular configuration, and wherein the tool section is eccentrically disposed, i.e., outside of the axis of rotation of the tool.

By rotating such an "eccentric tool", the rotational movement of the tool is converted into a displacement movement of the light source assembly and permits simple and exact displacement.

In order to convert the movement of the tool into a displacement movement of the light source assembly, it is provided, for example, that the adjustment opening is a slot, which extends normally relative to the displacement direction and lies in the displacement plane of the light source assembly.

The assembly carrier is a heat sink, for example.

It is usually provided that the one or more light sources are LED light sources, wherein each LED light source comprises at least one, preferably exactly one light-emitting diode, and wherein the light source carrier is designed as an LED printed circuit board.

In order to generate light segments, it is furthermore provided that the auxiliary optical unit comprises two or more light exit surfaces, which are separated from one another, and wherein light is radiated from at least one LED light source via each light exit surface.

In this case, the auxiliary optical unit comprises two or more optical waveguides, e.g., in the form of light tunnels or totally reflecting optical waveguides, each of which has a light entry surface or a light-coupling surface and each of which has a light exit surface or a light-decoupling surface. In each of these optical waveguides, light from at least one LED light source is coupled in and is radiated via the light-decoupling surface as a light segment. Each optical waveguide has light sources that are assigned only to this optical waveguide such that very specific light segments can be shut off or dimmed, or only very specific light segments can be activated.

To this end, it is favorable when each LED light source can be separatedly activated and switched on or off, and/or can be dimmed, wherein, preferably, each light-emitting diode of an LED light source can be separately activated and switched on or off, and/or can be dimmed.

In this manner, the light pattern can be switched on or off in segments, i.e., per each light exit surface, as described above.

It is furthermore provided that the secondary optical unit is a lens, in particular a projection lens. The secondary optical unit carrier is therefore also referred to as a "lens holder".

The invention furthermore relates to a lighting device for a motor vehicle or for a motor vehicle headlight, which comprises at least the above-described light module.

Preferably, such a lighting device comprises two or more light modules, wherein at least one, preferably all are designed as above-described light modules.

Basically, it could be provided that only one light module or, in the case of n modules, wherein n=whole number, (n−1) modules can be adjusted according to the invention. Preferably, however, all the light modules are designed according to the invention such that identical light modules can be used and, in addition, optimal use can be made of the adjustment possibilities.

In particular, it is provided that the two or more light modules are jointly set up to generate a light distribution.

These light distributions are, e.g., high-beam lighting, in particular anti-dazzle high-beam lighting, cornering lighting, adverse-weather lighting, highway lighting, daytime-driving lighting, etc.; these have a segmented design, for example, and all light segments in combination form the light distribution.

In a specific embodiment, the two or more light modules are disposed on a common carrier body.

In order to adjust the light patterns of the light modules, it can be furthermore provided that one, two, or more, preferably all light modules can be adjusted in the vertical direction, e.g., being mounted on the carrier body such that each one is displaceable in the vertical direction or each one is pivotable about a horizontal axis.

Figure 2:
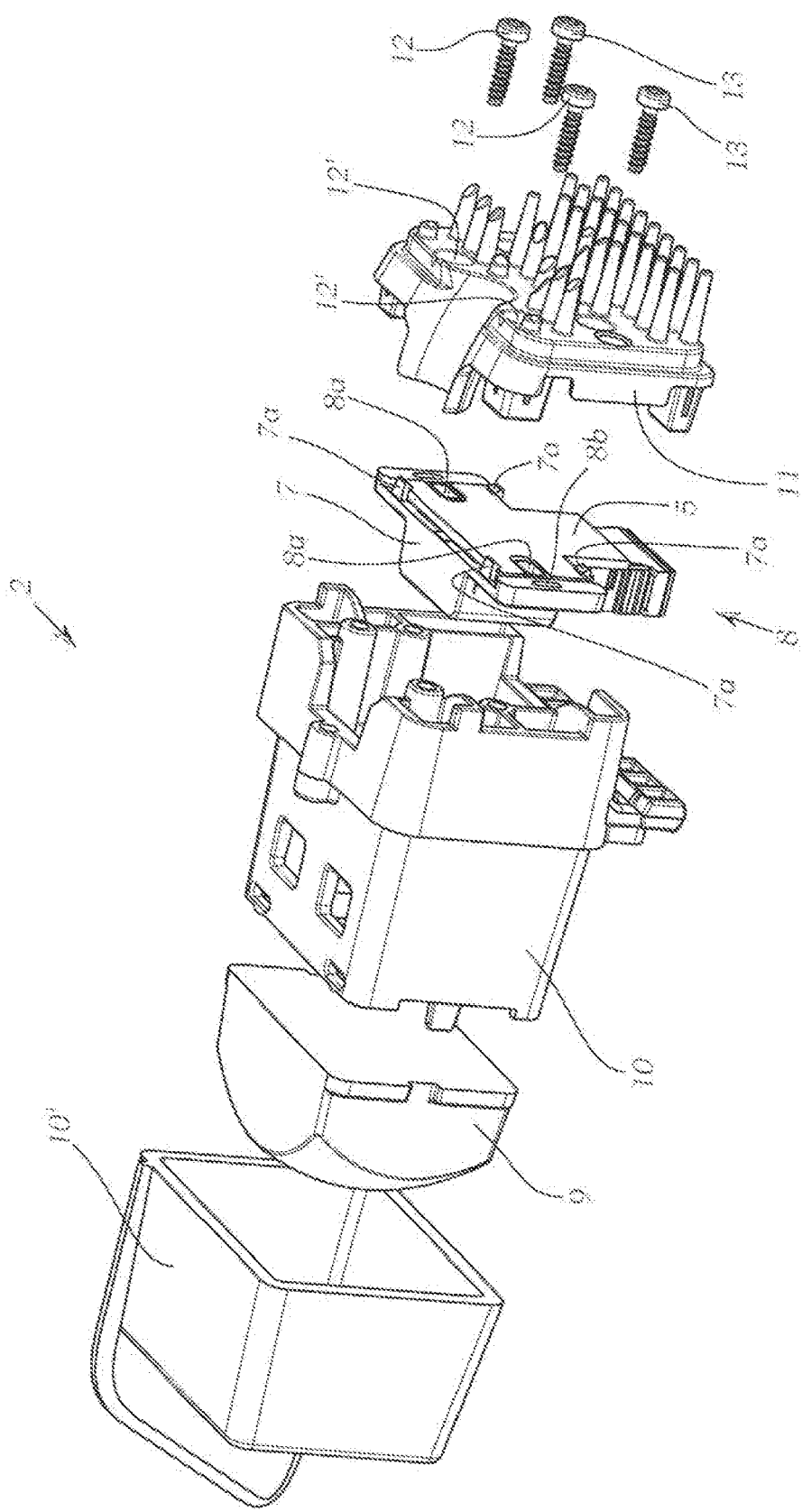
Figure 3A:
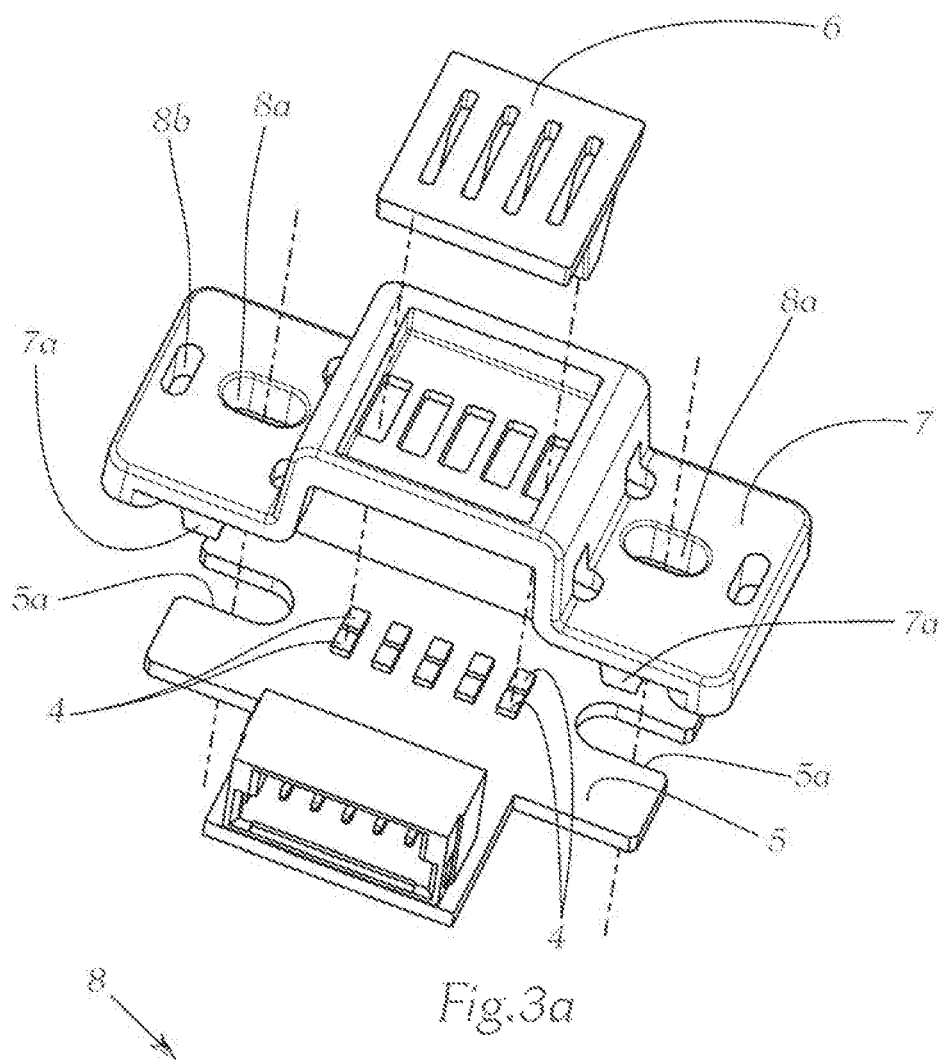
Figure 3B:
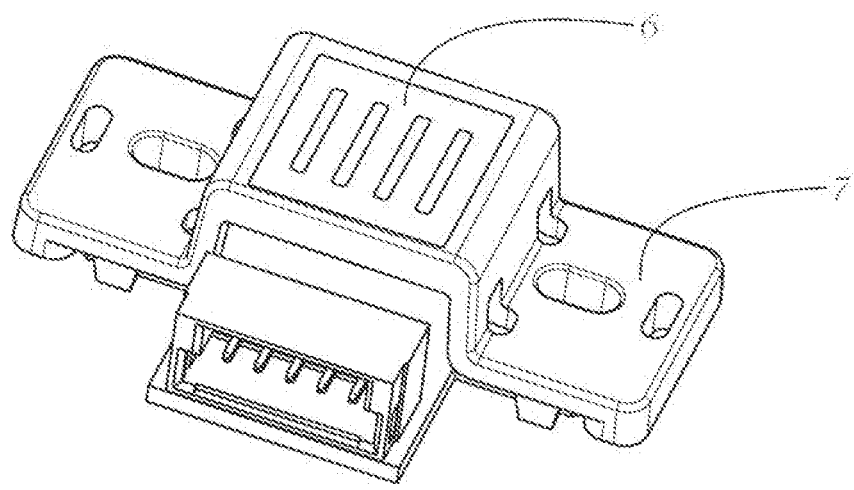
Figure 4:
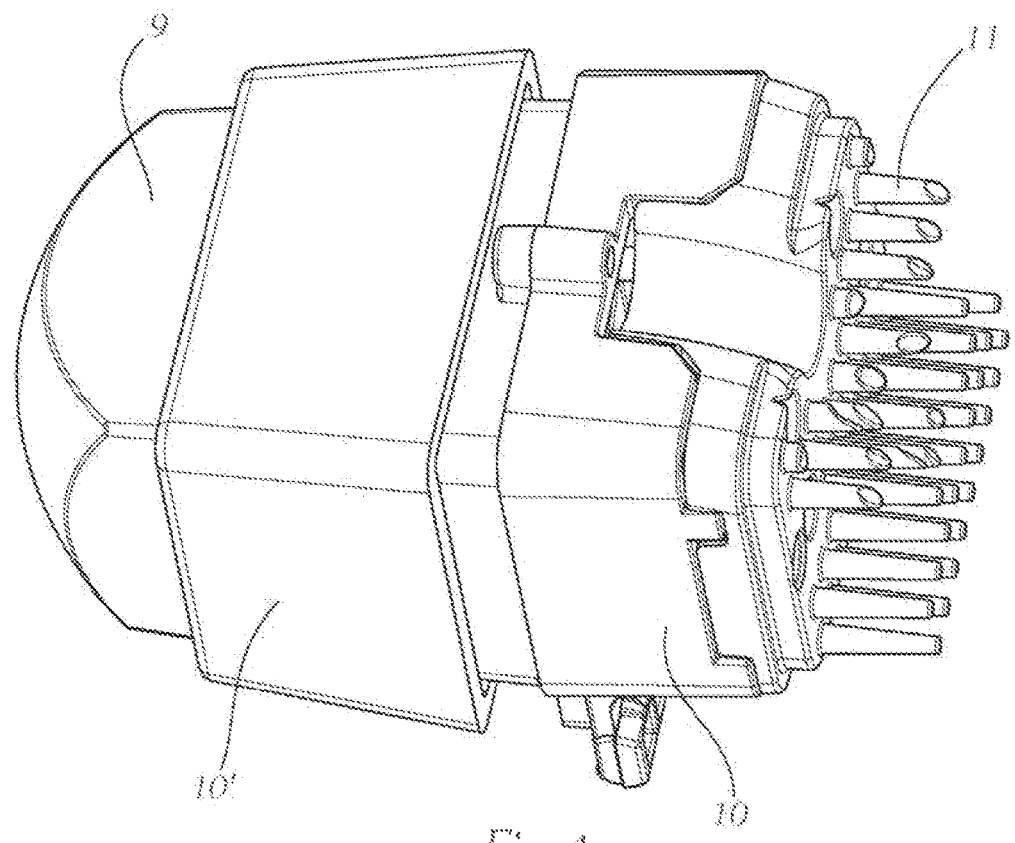
Figure 9:
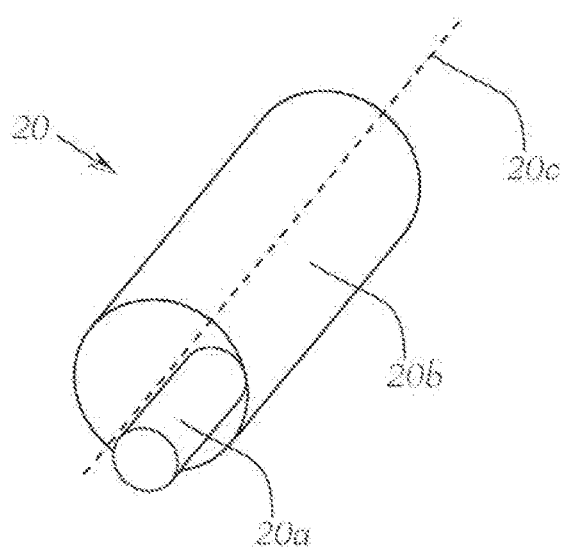
Figure 5:
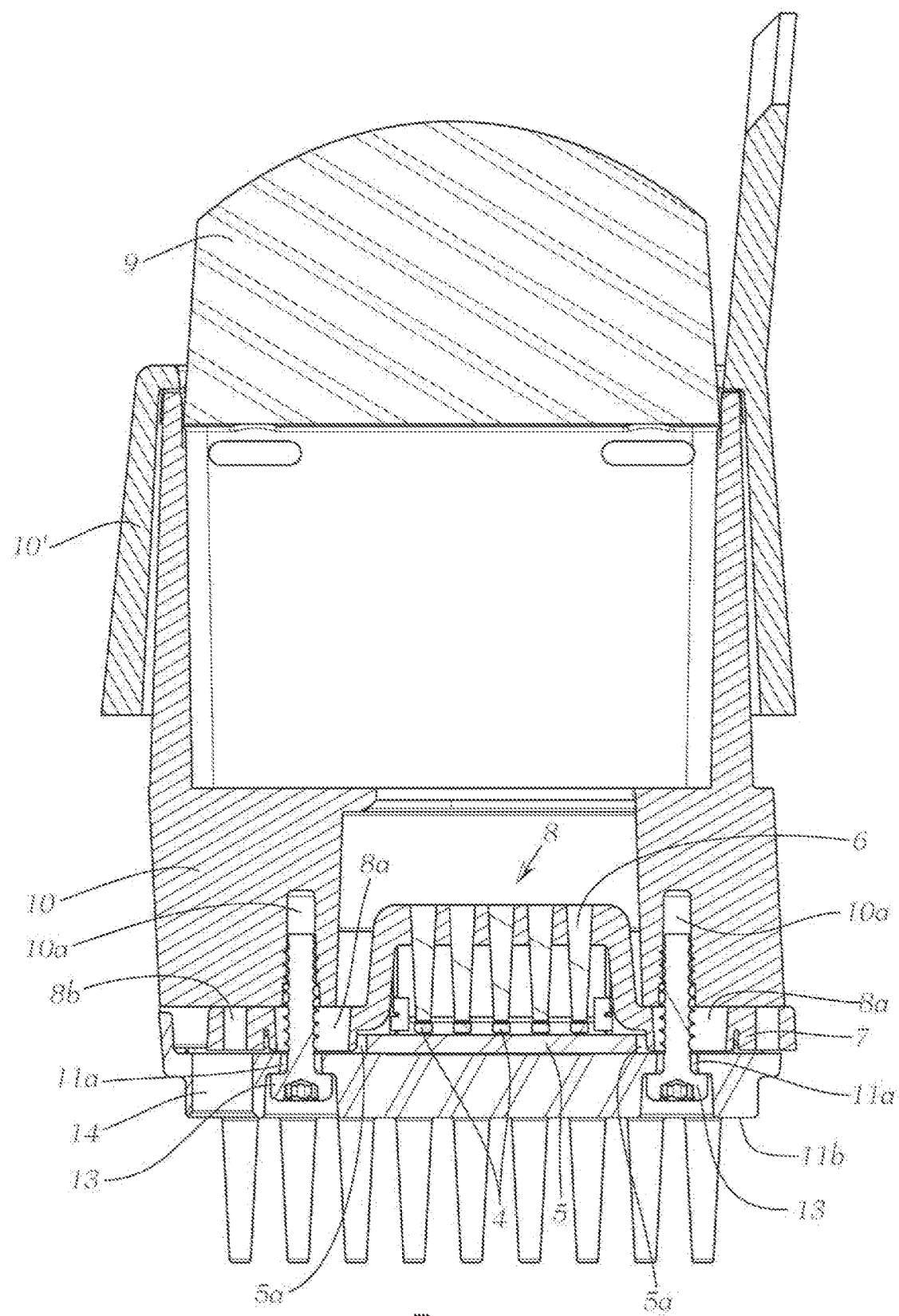
Figure 6:
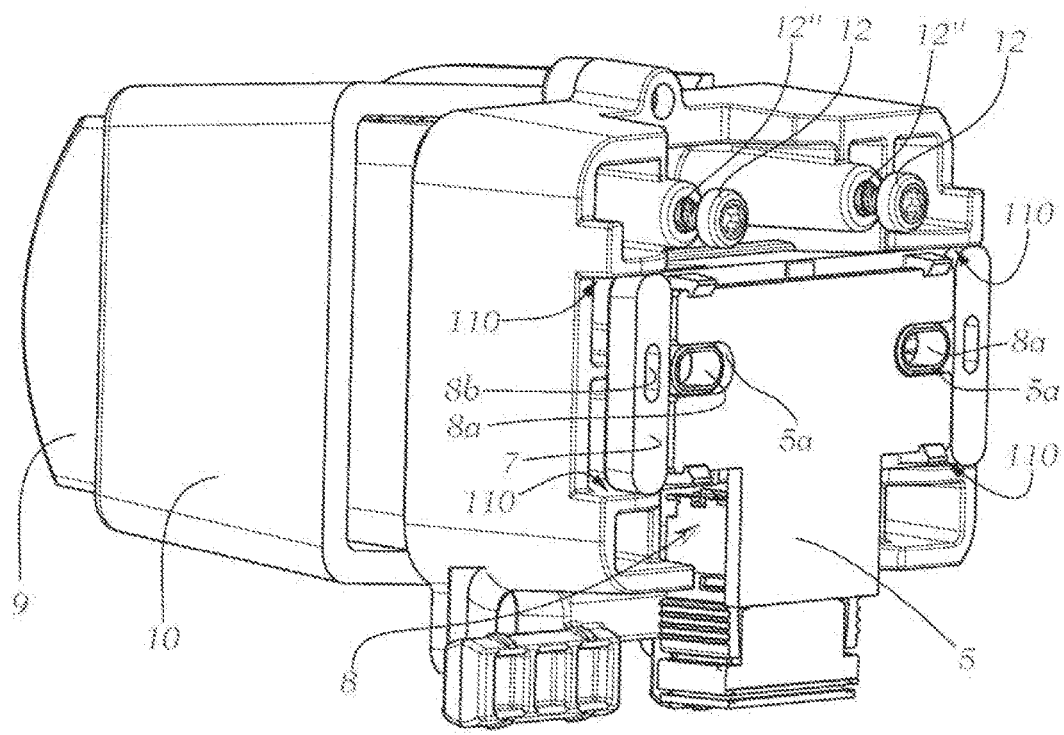
Figure 7:
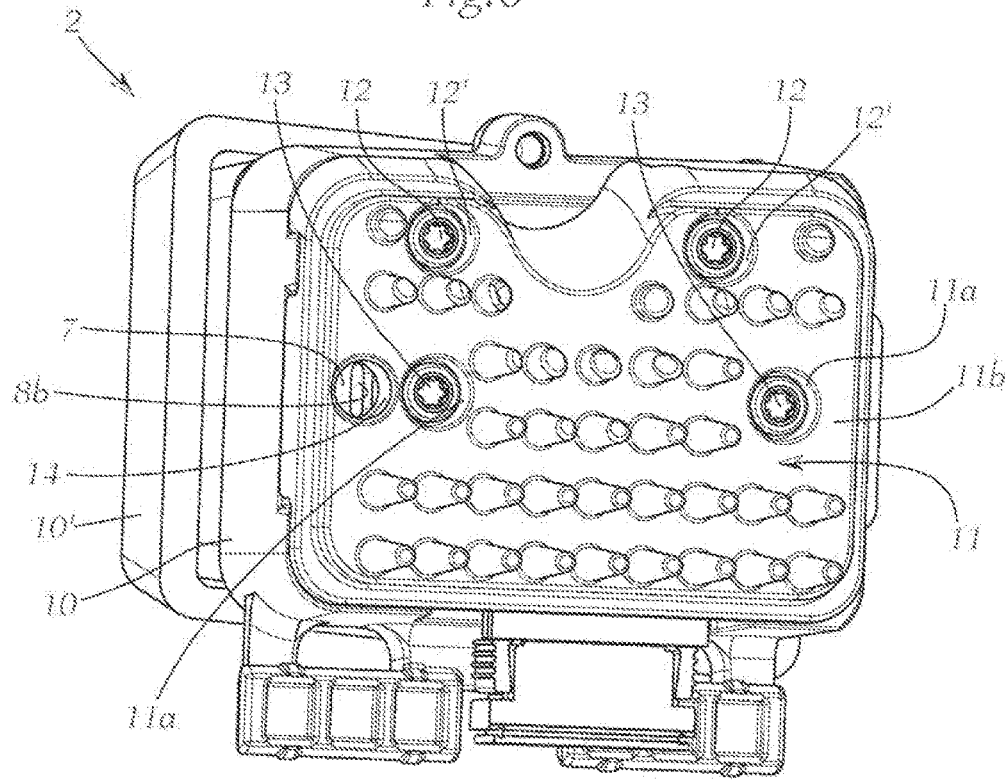
Figure 8:
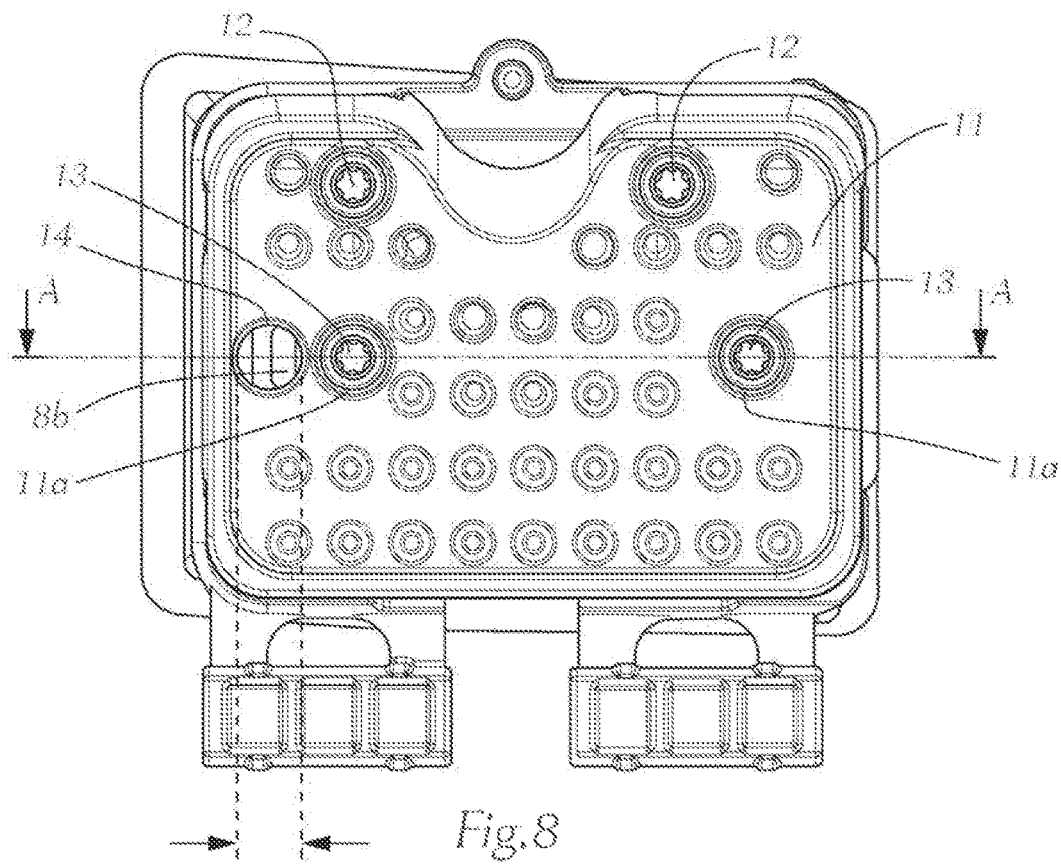
Figure 10:
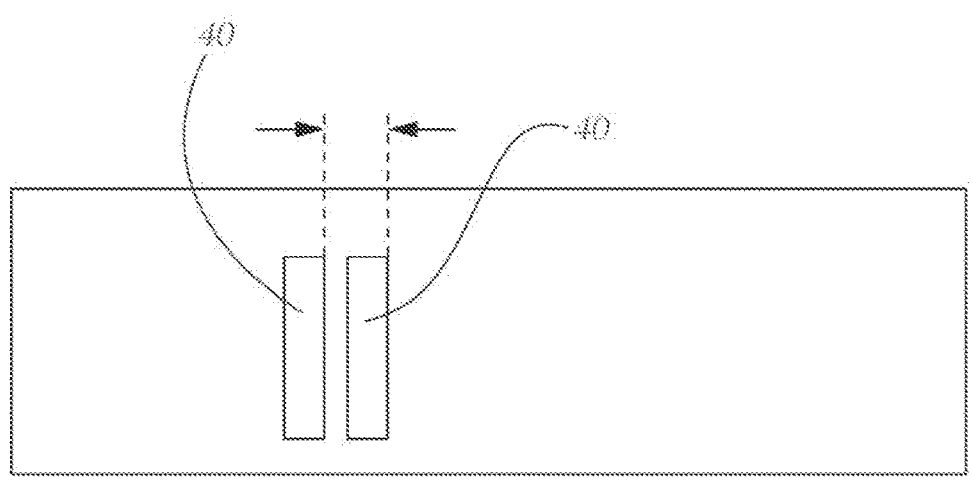

The invention is explained in greater detail in the following by reference to the drawings. In the drawings:

FIG. 1 shows a perspective view, diagonally from the rear, of a lighting device having three light modules, FIG. 2 shows a light module according to the invention, in an exploded view, FIG. 3a shows the components of a light source assembly before this is assembled, FIG. 3b shows the assembled light source assembly, FIG. 4 shows an assembled light module according to the invention, FIG. 5 shows a horizontal section along the line A-A from FIG. 8 through a light module according to the invention, in the region of the locking screws, FIG. 6 shows a light module according to the invention, in a view diagonally from the rear, with the assembly carrier removed, FIG. 7 shows a light module, according to the invention, having an assembly carrier, FIG. 8 shows the light module in a rear view, FIG. 9 shows a tool for adjusting the light source assembly, and FIG. 10 shows a roughly schematic illustration of light segments, generated with a light module according to the invention, and the effect of displacing the light source assembly.

FIG. 1 shows a lighting device 1 for a motor vehicle or for a motor vehicle headlight, having three light modules 2 according to the invention, which are disposed on a common carrier body 3 and which are set up to generate a common light distribution.

This light distribution is, e.g., high-beam lighting, in particular anti-dazzle high-beam lighting, cornering lighting, adverse-weather lighting, highway lighting, daytime-driving lighting, etc.; these have a segmented design, for example, and all light segments in combination form the light distribution.

The light modules can also be adjustable in the vertical direction, i.e., upward and downward, e.g., said light modules can be designed to be displaceable or pivotable about a horizontal axis; this is not shown in greater detail in the figures, however.

FIG. 2, in combination with FIGS. 3a, 3b, shows a light module 2 according to the invention, of the type used in FIG. 1. In this case, the light module 2 comprises a number of light sources 4, which are disposed on a light source carrier 5, and which couple light into an upstream auxiliary optical unit 6. The auxiliary optical unit 6 can be fastened on the light source carrier 5 by means of an auxiliary optical unit carrier 7 such that the light sources 4, the light source carrier 5, the auxiliary optical unit 6, and the auxiliary optical unit carrier 7 form a light source assembly 8.

The auxiliary optical unit 6 has five optical waveguides, which are inserted into the auxiliary optical unit carrier 7. In this example, two LED light sources each comprising one light-emitting diode couple light into each of these five optical waveguides. This light exits the optical waveguides via the light exit surfaces of the optical waveguides and, in each case, forms one segment in the light pattern.

Therefore, five groups of light sources are provided, i.e., one group per optical waveguide, and at least each group can be activated, i.e., switched on and off, dimmed, etc., separately from the others. In this manner, the light pattern can be switched on or off, etc., in segments, i.e., per each optical waveguide, in the manner described above.

The auxiliary optical unit carrier 7 can be fastened on the light source carrier 5 preferably in a detachable manner, e.g., the two parts can be snapped into or clipped onto one another, as is shown in FIGS. 3a and 3b. In this case, the light source carrier 5 and the auxiliary optical unit carrier 7 are first centered relative to one another and are then snapped together by means of a snap-in hook 7a to form the light source assembly 8.

In addition, the light module 2 has secondary optical unit 9, in particular a lens, e.g., a projection lens, which is disposed behind the auxiliary optical unit 6 in the light exit direction and is held by means of a secondary optical unit carrier (lens carrier) 10. A lens aperture 10', which partially covers the lens carrier 10, is also shown.

In addition, an assembly carrier 11 is provided, relative to which the light source assembly 8 can be fastened. This assembly carrier 11 is typically a heat sink 11.

In addition, FIG. 3 also shows clamping screws 12 and locking screws 13, the function of which is described in greater detail in the following.

Finally, FIG. 4 shows the light module 2 in the assembled state.

The following is apparent from FIGS. 5-7: The light module 2 comprises clamping means in the form of two clamping screws 12, wherein, by means of these clamping screws 12, the heat sink 11 can be screwed together with the lens carrier 10, as shown in FIG. 7. As a result, the assembly 8 is clamped between the heat sink 11 and the lens carrier 10. In particular, as shown clearly in FIG. 5, the auxiliary optical unit 7 is clamped between these two components.

If this clamping is then detached to the extent that the heat sink 11 and the lens carrier 10 are still (loosely) connected to one another, the assembly 8 located therebetween becomes displaceable, and specifically substantially parallel to the heat sink 11. In principle, any type of displacement (left-right, up-down) is feasible, including combinations of these displacement possibilities. Horizontal displacement (left-right) is carried out in the embodiment shown.

By displacing the assembly 8, the light distribution generated by this light source assembly 8 can be oriented in a corresponding manner. Finally, in the correct, desired position, the light source assembly 8 can be fixed in position relative to the assembly carrier (heat sink) 11.

The clamping screws 12 directly connect the assembly carrier 11 and the secondary optical unit carrier 10 without the assembly 8 being contacted by these clamping screws 12, as is clearly shown in FIG. 6 in combination with FIG. 7. To this end, the heat sink 11 has corresponding openings 12'. Corresponding threads 12" are provided in the lens carrier 10.

According to the specific embodiment of the invention, as shown in the figures, the secondary optical unit carrier 10 forms a guide 110 for the light source assembly 8, in which this light source assembly 8 is mounted so as to be displaceable, in particular laterally, i.e., horizontally (left-right) relative to the installation position of the light module 2.

As already described with reference to FIG. 4, it is furthermore provided that locking means in the form of two locking screws 13 are provided, by means of which the light source assembly 8 can be fixed relative to the assembly carrier 11.

After setting the correct position, it is therefore also possible, in addition to the clamping, to fix the light source assembly 8 via the locking screws 13 relative to the assembly carrier 11 such that the light source assembly is reliably positioned also during operation of the vehicle.

The locking screws 13 extend through the back side 11b of the assembly carrier 11, through a respectively assigned locking screw opening 11a in the assembly carrier 11. In addition, the locking screws 13 extend through the assembly 8, through a respectively assigned assembly opening 8a and, finally, into a corresponding locking screw thread 10a, into which the secondary optical unit carrier 10 can be screwed.

The assembly openings 8a are designed as slots, wherein, in the installation position in the embodiment shown, said slots extend in the horizontal direction, substantially normally relative to the light exit direction.

The assembly openings 8a are preferably formed on the auxiliary optical unit carrier 7. The light source carrier 5 has corresponding recesses 5a such that the openings 8a are exposed.

Finally, it becomes clear from FIGS. 8-10 that, in order to easily adjust the light source assembly, the assembly carrier 11 preferably has a tool opening 14 (see also FIGS. 5 and 7) for the insertion of a displacement tool 20 (FIG. 9), by means of which the light source assembly 8 can be displaced.

The displacement tool 20 is mounted via a tool carrier section 20b, which has a circular cross section, so as to be rotatable in the tool opening 14, which also has a circular configuration. The tool also has a tool section 20a, which is eccentrically disposed, i.e., outside of the axis of rotation 20c of the tool 20.

This tool section 20a engages into a adjustment opening 8b (FIGS. 5-8) in the light source assembly 8, wherein said adjustment opening 8b is disposed opposite the tool opening 14, wherein the adjustment opening 8b is preferably disposed on the auxiliary optical unit carrier 7, as shown.

By moving the tool 20 in the tool opening, the tool displaces the light source assembly 8 in a corresponding manner via the tool section 20a. Specifically, by rotating such an "eccentric tool" 20, the rotational movement of the tool is converted into a displacement movement of the light source assembly 8 and permits simple and exact displacement of the assembly 8.

In order to convert the movement of the tool into a displacement movement of the light source assembly, it is specifically provided that the adjustment opening 8b is a slot, which extends normally relative to the displacement direction and lies in the displacement plane of the light source assembly 8.

FIG. 10 shows exactly one of five light segments 40, which can be generated using a light module 2, and the two extreme positions of the light segments, which can be set via corresponding displacement as described above.

The invention claimed is:

1. A light module for a motor vehicle headlight or other headlight, wherein the light module comprises:
   one or more light sources, which is/are arranged on a light source carrier;
   at least one auxiliary optical unit which is configured to be fastened on the light source carrier by an auxiliary optical unit carrier such that the one or more light sources, the light source carrier, the at least one auxiliary optical unit, and the auxiliary optical unit carrier form a light source assembly;
   a secondary optical unit, which is arranged behind the at least one auxiliary optical unit, in the light exit direction, and is held by a secondary optical unit carrier;
   an assembly carrier to which the light source assembly is configured to be fastened;
   at least one clamping screw with which the light source assembly is configured to be detachably clamped between the secondary optical unit carrier and the assembly carrier, wherein, in a detached state of the at least one clamping screw, in which the at least one clamping screw is detached only so far that the secondary optical unit carrier and the assembly carrier are still connected to one another, the light source assembly is displaceable substantially parallel to the assembly carrier, and wherein the at least one clamping screw directly connects the assembly carrier and the secondary optical unit carrier to one another such that the at least one clamping screw does not extend through the light source assembly; and
   at least one locking screw with which the light source assembly is configured to be fixed relative to the assembly carrier, wherein the at least one locking screw fasten the light source assembly on the assembly carrier and the secondary optical unit carrier, and wherein the at least one locking screw extends through a back side of the assembly carrier, through an assigned locking-screw opening in the assembly carrier, and through an assembly opening of the light source assembly, and is configured to be screwed into a corresponding locking-screw thread in the secondary optical unit carrier.

2. The light module of claim 1, wherein the light module comprises exactly two clamping screws.

3. The light module of claim 1, wherein the light source assembly is mounted within the secondary optical unit carrier so as to be displaceable horizontally relative to an installation position of the light module.

4. The light module of claim 1, wherein the at least one assembly opening is designed as a slot.

5. The light module of claim 1, wherein the light module comprises exactly two locking screws having assigned openings or threads.

6. The light module of claim 1, wherein the at least one assembly opening is formed on the auxiliary optical unit carrier.

7. The light module of claim 1, wherein the auxiliary optical unit carrier is configured to be detachably fastened on the light source carrier.

8. The light module of claim 1, wherein the assembly carrier has a tool opening for the insertion of a displacement tool with which the light source assembly is configured to be displaced.

9. The light module of claim 1, wherein the assembly carrier is a heat sink.

10. The light module of claim 1, wherein the one or more light sources are LED light sources, wherein each LED light source comprises at least one light-emitting diode, and wherein the light source carrier is designed as an LED printed circuit board.

11. The light module of claim 1, wherein the secondary optical unit is a projection lens or other lens.

12. A lighting device for a motor vehicle or for a motor vehicle headlight, comprising at least one light module of claim 1.

13. The light module of claim 4, wherein the slot extends in a horizontal direction, substantially normal to the light exit direction.

14. The light module of claim 7, wherein the auxiliary optical unit carrier is detachably snapped into or clipped onto the light source carrier.

15. The light module of claim 8, wherein the light source assembly has an adjustment opening, which is disposed opposite the tool opening, wherein the adjustment opening is disposed on the auxiliary optical unit carrier, and into which adjustment opening the displacement tool engages via a tool section.

16. The light module of claim 15, wherein the displacement tool has a tool mounting section, which has a circular cross section, is rotatably mounted in the tool opening, which also has a circular configuration, and wherein the tool section disposed outside of the axis of rotation of the displacement tool.

17. The light module claim 15, wherein the adjustment opening is a slot, which extends normally relative to the displacement direction and lies in the displacement plane of the light source assembly.

18. The light module of claim 10, wherein the auxiliary optical unit comprises two or more light exit surfaces, which are separated from one another, and wherein light is configured to be radiated from at least one LED light source via each light exit surface.

19. The light module of claim 10, wherein the LED light sources are configured to be separately activated and switched on or off and/or dimmed.

20. The light module of claim 19, wherein each light-emitting diode of an LED light source is configured to be separately activated and switched on or off and/or dimmed.

21. The lighting device of claim 12, wherein the lighting device comprises two or more of said at least one light module.

22. The lighting device of claim 12, wherein the at least one light module is mounted on a carrier body such that the at least one light module is displaceable in the vertical direction or is pivotable about a horizontal axis.

23. A vehicle headlight comprising at least one lighting device of claim 12.

24. The lighting device of claim 21, wherein the two or more light modules in combination are set up to generate a light distribution.

25. The lighting device of claim 21, wherein the two or more light modules are disposed on a common carrier body.

26. The lighting device of claim 22, which comprises two or more of the at least one light module and all of the light modules are mounted on the carrier body such that each one of the light modules is displaceable in the vertical direction or pivotable about the horizontal axis.

* * * * *